(12) United States Patent
Janssen et al.

(10) Patent No.: US 12,058,994 B2
(45) Date of Patent: Aug. 13, 2024

(54) TARGETED WEED CONTROL WITH CHEMICAL AND MECHANICAL MEANS

(71) Applicant: BASF Agro Trademarks GmbH, Ludwigshafen am Rein (DE)

(72) Inventors: Ole Janssen, Cologne (DE); Mirwaes Wahabzada, Langenfeld (DE); Harry Strek, Leverkusen (DE)

(73) Assignee: BASF Agro Trademarks GmbH, Ludwigshafen am Rhein (DE)

( * ) Notice: Subject to any disclaimer, the term of this patent is extended or adjusted under 35 U.S.C. 154(b) by 397 days.

(21) Appl. No.: 17/598,793

(22) PCT Filed: Mar. 27, 2020

(86) PCT No.: PCT/EP2020/058646
§ 371 (c)(1),
(2) Date: Sep. 27, 2021

(87) PCT Pub. No.: WO2020/201046
PCT Pub. Date: Oct. 8, 2020

(65) Prior Publication Data
US 2022/0183267 A1     Jun. 16, 2022

(30) Foreign Application Priority Data
Mar. 29, 2019   (EP) .................................... 19166249

(51) Int. Cl.
*A01M 21/00*     (2006.01)
*A01M 7/00*     (2006.01)
(Continued)

(52) U.S. Cl.
CPC ........ *A01M 21/043* (2013.01); *A01M 7/0089* (2013.01); *A01M 21/02* (2013.01)

(58) Field of Classification Search
CPC ... A01M 21/043; A01M 7/0089; A01M 21/02
(Continued)

(56) References Cited

U.S. PATENT DOCUMENTS 10,405,535 B2   9/2019  Rees
2019/0362146 A1*  11/2019  Polzounov ............. G06N 3/045

FOREIGN PATENT DOCUMENTS

EP    3 425 572 A1   1/2019
EP    3425572 A1    1/2019
(Continued)

OTHER PUBLICATIONS

International Search Report and Written Opinion for PCT/EP2020/058646 mailed May 11, 2020, 9 pgs.

*Primary Examiner* — Tiffany P Young
(74) *Attorney, Agent, or Firm* — Lowenstein Sandler LLP (57) ABSTRACT

A method for weed management is provided. The method may comprise collecting image data of a plantation field after being applied with a primary weed control technique. The method may further include recognizing items indicative of an occurrence of a weed in the collected image data. The method may further include generating a weed pressure map indicative of a weed pressure in the plantation field. The method may further include determining one or a plurality of target areas for weed management in the generated weed pressure map and outputting a treatment control signal, which, when transmitted, causes an activation of at least one weed treatment device to apply at least one secondary weed control technique to the one or the plurality of determined target areas, wherein the at least one secondary weed control technique is different from the primary weed control technique.

15 Claims, 3 Drawing Sheets

(51) Int. Cl.
*A01M 21/02* (2006.01)
*A01M 21/04* (2006.01)

(58) Field of Classification Search
USPC .......................................................... 701/50
See application file for complete search history.

(56) References Cited

FOREIGN PATENT DOCUMENTS

JP            H0779681 A    *   3/1995
RO              130713        11/2015

* cited by examiner

TARGETED WEED CONTROL WITH CHEMICAL AND MECHANICAL MEANS

CROSS-REFERENCE TO RELATED APPLICATION(S)

This application is a national stage entry under 35 U.S.C. § 371 of International Application No. PCT/EP2020/058646, filed on Mar. 27, 2020, which claims the benefit of priority of European Patent Application No. 19166249.3, filed on Mar. 29, 2019, the disclosures of which are hereby incorporated by reference herein in their entireties.

FIELD OF THE INVENTION

This invention relates generally to weed management, and more specifically to a method for weed management in a plantation field. The invention relates further to a decision-support system in a plantation field, to a treatment device for weed treatment in a plantation field, and to a system for weed management in a plantation field.

BACKGROUND OF THE INVENTION

Commercial farms often adopt chemical control using selective or non-selective herbicides. However, the weed management gets increasingly under pressure, as resistance may develop when a target adapts to circumvent a particular control strategy. For example, herbicide resistance may be inherited and may occur through selection of weeds that survive herbicide treatment. With repeated selection, resistant weeds may multiply until they dominate the population. If weed management is not done properly, resistance may develop in any field, as resistance may have been influenced by proximity to another affected field and farm gateways on the farm. Herbicide strategy may be optimized to ensure that resistance does not develop to these herbicide by paying attention to recommended rate, nozzle choice, water volumes and spray timing to maximize product effectiveness.

SUMMARY OF THE INVENTION

There may be a need to improve weed management in a plantation field.

The object of the present invention is solved by the subject-matter of the independent claims. Further embodiments and advantages of the invention are incorporated in the dependent claims. The described embodiments similarly pertain to the method for weed management in a plantation field, to the decision-support system in a plantation field, to the treatment device for weed treatment in a plantation field, and to the system for weed management in a plantation field.

A first aspect of the invention relates to a method for weed management in a plantation field. The method comprises collecting image data of the plantation field after being applied with a primary weed control technique, recognizing items indicative of an occurrence of a weed in the collected image data, generating a weed pressure map indicative of a weed pressure in the plantation field based on the recognized items, determining one or a plurality of target areas for weed management in the generated weed pressure map, if the weed pressure of the one or the plurality of target areas extends a predetermined threshold, and outputting a treatment control signal indicative of the one or the plurality of determined target areas, which when transmitted causes an activation of at least one weed treatment device to apply at least one secondary weed control technique to the one or the plurality of determined target areas, wherein the at least one secondary weed control technique is different from the primary weed control technique.

In other words, the primary weed control technique is applied to the plantation field at a field scale. The primary weed control technique may be less expensive and/or non-selective, such that the majority of the weed types in the plantation field can be eradicated with relatively low costs. However, in some situations the primary weed control technique cannot eradicate all weed species. For example, there may be an area with weeds that are tolerant to the primary weed control technique. For example, if the primary weed control technique uses herbicides, there may be an area with herbicide-resistant weeds. Thus, in addition to the primary weed control technique applied at a field scale, the secondary weed control technique may be advantageously applied to the field at a local scale targeting at areas that requires an additional, different treatment. The combination of the application of the primary weed control technique at a field scale and the secondary weed control technique at a local level may allow an efficient and effective weed management in the plantation field.

According to an embodiment of the invention, the method further comprises applying, with the at least one weed treatment device, at least one secondary weed control technique to the one or the plurality of determined target areas based on the treatment control signal.

For example, the treatment control signal may indicate the geographical information of the target areas. The geographical information may be used to provide guidance of GPS-guided ground robots, or aerial sprayers to apply weed control only at these target areas.

According to an embodiment of the invention, the primary weed control technique is a chemical weed control technique with a first active ingredient. The at least one secondary weed control technique comprises a chemical weed control technique with a second active ingredient and/or a mechanical weed control technique.

The first active ingredient may be less expensive than the second active ingredient. The first active ingredient may be non-selective, whereas the second active ingredient may be selective for specific weed species. The mechanical weed control technique may be used e.g. when the target areas comprise herbicide-resistant weeds. In other words, integrated procedures may be adopted that involves a few different methods for a better eradication of weeds in the target areas.

According to an embodiment of the invention, the determination of one or a plurality of target areas comprises the step of determining a geographical information of the one or the plurality of target areas.

For example, sensors may allow each and every image to be tagged with GPS coordinates. The GPS coordinates may be used to provide guidance of GPS-guided ground robots, or aerial sprayers to apply weed control only at these target areas.

According to an embodiment of the invention, the determination of one or a plurality of target areas comprises the step of recognizing a single or a plurality of weeds in the one or the plurality of determined target areas for weed management and the step of determining a weed type and/or a weed density of the single or the plurality of recognized weeds.

An automated machine-based determination or recognition process may be used for a specific type of weed starting from the image data, pre-processing of the image data, deriving metadata from the digital image and use there by e.g. neural network based classifier for a probability based analysis of the image data, and finally a recognition on one or more types of weeds. Spectral signatures, thermal signatures and/or texture specifications of the weeds may be used for distinguishing weeds and crops depending on the types of image data. This may allow choosing appropriate secondary weed control technique for the specific weed and/or intensity.

According to an embodiment of the invention, the determination of one or a plurality of target areas comprises identifying rows and/or a density of a single or a plurality of crops in the plantation field based on the collected image data.

For example, spectral imagery or thermal imagery may be used to distinguish the spectral signatures of weed and crops and to identify the rows of crops in the plantation field. This may advantageously allow a better identification of the target areas for weed treatment.

According to an embodiment of the invention, the determination of one or a plurality of target areas comprises the step of identifying a single or a plurality of target areas with at least one resistant weed based on historical information of the plantation field.

Weed infestation maps of previous seasons may be used to determine these target areas. As these target areas comprise herbicide-resistant weeds, the secondary weed control technique may be other weed control technique, such as mechanical weed control techniques, for a better weed control.

According to an embodiment of the invention, the determination of one or a plurality of target areas for weed management may further comprise the step of identifying a single or a plurality of target areas, where the use of crop protection products is not recommended, based on historical information of the plantation field and recommending an application of a mechanical weed control technique in the single or the plurality of the identified target areas.

For example, weed infestation maps of previous seasons may be used, which provides the information about areas where the use of crop protection products is not effective or not preferred. In these areas, mechanical weed control techniques may be applied for a better weed management.

According to an embodiment of the invention, the determination of one or a plurality of target areas for weed management may further comprise determining, for each determined target area, a respective secondary weed control technique. The treatment control signal is indicative of the respective determined secondary weed control technique for each target area, which when transmitted causes an activation of at least one weed treatment device to apply, for each determined target area, the respective determined secondary weed control technique.

The respective secondary weed control technique may be determined based on at least one of the following: i) the generated weed pressure map, ii) the determined geographical information of the single or the plurality of target areas with a weed pressure above a predefined threshold, iii) the determined weed type and/or the determined weed density of the single or the plurality of target areas, iv) the identified rows and/or the identified density of the single or the plurality of crops in the plantation field, v) the identified single or the identified plurality of target areas with at least one resistant weed, and vi) the identified one or plurality of target areas to be applied with a mechanical weed control technique. This may advantageously allow a choice of an appropriate weed control technique depending on the weed species, intensity and/or historical information of the plantation field and to apply an appropriate weed control technique to which the weeds are susceptible.

According to an embodiment of the invention, the application of at least one secondary weed control technique comprises applying, for each determined target area, the respective determined secondary weed control technique based on the treatment control signal.

The secondary weed control technique and the target areas may be provided as configuration information, which may be loaded onto a respective weed treatment device to regulate the activity of weed treatment devices.

According to an embodiment of the invention, the method further comprises the step of generating a field record. The field record comprises at least one of the following: i) the generated weed pressure map, ii) the determined geographical information of the single or the plurality of target areas with a weed pressure above a predefined threshold, iii) the determined weed type and/or the determined weed density of the single or the plurality of target areas, iv) the identified rows and/or the identified density of the single or the plurality of crops in the plantation field, v) the identified single or the identified plurality of target areas with at least one resistant weed, and vi) the identified one or plurality of target areas to be applied with a mechanical weed control technique.

The field report may be used for online or offline precision farming. The field report may provide a detailed information of occurrence and spread of weed species in the plantation field. Additionally, the field record of previous seasons may also provide a detailed information of areas, which are prone to weed infestation.

A second aspect of the invention relates to a decision-support system for weed management. The decision-support system comprises a data interface, an image recognition unit, a weed pressure mapping unit, a determination unit, a controlling unit, and a treatment control interface. The image recognition unit is configured to recognize items indicative of an occurrence of a weed in image data of the plantation field received from the data interface. The weed pressure mapping unit is configured to generate a weed pressure map indicative of a weed pressure in the plantation field based on the recognized items. The determination unit is configured to determine one or a plurality of target areas for weed management in the generated weed pressure map, if the weed pressure of the one or the plurality of target areas extends a predetermined threshold. The controlling unit is configured to generate a treatment control signal indicative of the one or the plurality of determined target areas and to output the treatment control signal to the treatment control interface, which when transmitted causes an activation of at least one weed treatment device to apply at least one secondary weed control technique to the one or the plurality of determined target areas.

In other words, a decision-support system may be used to detect occurrence and map the spread of weed species in a plantation field based on the collected image data, e.g. spectral data or thermal data, of the plantation field. The weed map produced may offer a robust basis for farmers to prepare weed control schedules, e.g. herbicide spray schedules, and a generalized weed control program and to regulate the activity of weed treatment devices accordingly. As will be explained hereafter, the decision-support system may also be configured to identify weeds, discriminate different types of weeds, and/or calculate herbicide requirements.

According to an embodiment of the invention, the determination unit is configured to determine, for each determined target area, a respective secondary weed control technique. The treatment control signal is indicative of the respective determined secondary weed control technique for each target area, which when transmitted causes an activation of at least one weed treatment device to apply, for each determined target area, the respective determined secondary weed control technique.

In other words, the decision-support system may control multiple treatment devices, each provided with a respective weed control technique and/or with a respective herbicide, to apply weed control only at targeted spots infested with weeds that are susceptible to the respective weed control technique and/or to the respective herbicide. Such an effort may reduce herbicide requirements and improve weed control efficiency. This may also reduce contamination of irrigation channels and ground water with herbicide.

A third aspect of the invention relates to a weed treatment device for weed treatment in a plantation field. The weed treatment device comprises a treatment control interface and a treatment arrangement with one or a plurality of treatment units. The treatment control interface of the weed treatment device is connectable to a treatment control of a decision-support system as described above and below and configured to receive a treatment control signal indicative of one or a plurality of target areas for weed treatment. The weed treatment device is configured to activate respective ones of treatment units of the treatment arrangement to apply a secondary weed control technique to the one or the plurality of target areas based on the received treatment control signal.

The weed treatment device may comprise ground robots with variable-rate applicators, aerial sprayers, or other variable-rate herbicide applicators to apply chemical weed control procedures. The weed treatment device may comprise ground robots with physical means to remove, injure, kill, or make the growing conditions unfavorable for the weeds. Geographical information may be used to guide various type of robots and sprayers to apply appropriate weed control technique only at spots infested with weeds and/or prone to weed infestation.

According to an embodiment of the invention, the treatment control signal is indicative of a respective secondary weed control technique for each target area. The weed treatment device is configured to apply the secondary weed control technique to a target area where the indicated secondary weed control technique matches that of the weed treatment device.

In other words, weed control methods may vary from one target area to another for a better weed control of the weeds in each area.

According to an embodiment of the invention, the weed treatment device is at least one selected from a mechanical weed treatment device configured to be steered by the controlling unit to apply a mechanical weed control technique to the one or the plurality of target areas, and a chemical weed treatment device configured to apply a second crop protection product to the one or the plurality of target areas.

This may advantageously allow weed control in a plantation field by adopting integrated procedures that involves at least two different methods. This may be beneficial for the situations where herbicides are not recommended and thus a mechanical weed control technique is more appropriate.

A fourth aspect of the invention relates to a system for weed management in a plantation field. The system comprises a sensor carrier, a decision-support system as described above and below, and at least one weed treatment device as described above and below. The sensor carrier is configured to collect image data of the plantation field after being applied with a primary weed control technique. The decision-support system is configured to determine one or a plurality of areas for weed management, and preferably, for each determined target area, a respective secondary weed control technique based on the collected image data, and to control the at least one weed treatment device to apply at least one secondary weed control technique to the one or the plurality of target areas.

The system may advantageously allow a weed control ranging from mission planning, acquiring imagery of a plantation field, spectral imaging processing, locating weeds, noting the intensity of infestation and mapping them, to practicing precision weed control techniques based on the weed infestation maps of this season optionally in combination with the previous seasons.

BRIEF DESCRIPTION OF THE DRAWINGS

Exemplary embodiments of the invention will be described in the following with reference to the following drawings.

DETAILED DESCRIPTION OF DRAWINGS

In the context of this description, the following conventions, terms and/or expressions may be used:

The term "image data" as used herein may denote image data captured with visual, infrared (IR), near infrared (NIR), multispectral and/or thermal sensors or cameras. The wavelength range of the sensor or camera may be selected for a better judgment of a specific weed type. For example, cameras with facility for color-infrared (CIR), thermal infrared (TIR), and visible NIR (VNIR) bandwidth imagery could be adopted to judge the effect of weedicide glyphosate. The image data may be collected using ground, satellite or drone platforms.

The term "items indicative of an occurrence of a weed" as used herein may denote a spectral signature of a weed, i.e. the particular spectral response of the weed in the image data that is different from the crops. The image data may be captured with visual, IR, NIR, multispectral sensors. The items indicative of an occurrence of a weed may also denote the thermal response of the weed that is different from the crops in the image data captured with a thermal sensor. The items indicative of an occurrence of a weed may also denote color or texture specification of a weed that is different from the crops. The texture specification may relate to leaf veins, characteristic forms of leaf segments, specific patterning and color distribution, micro hairs on the surface atop of the leaf and the edge of the leaf.

The term "weed" as used herein may denote an unwanted plant of any species that can quickly adapt to any environment. Hence, the expression weed may also be related to plant among crop or cultivated or economic plants that are useful in the sense of harvesting fruits of grown up seed. Weed may disturb the process of the growth of the crop and decrease the yield of an agriculture field.

The term "weed pressure" (WP) as used herein may denote that an estimate of the percentage of weeds that contribute to the total cover of both crops and weeds in a given area. Weed pressure values may be ranged between 0 in case of total absence of weeds, and 100 in case of total absence of crops. For simplify expert assessment of digital images, four categories for the weed pressure may be formulated. The interval bounds for the weed pressure may be as follows: WP1 (0-10), WP2 (11-20), WP3 (21-35), and WP4 (greater than 35).

The term "weed pressure map" as used herein may denote the weed pressure distribution in a plantation field. For example, the plantation field may be divided into a plurality of grids in form of a rectangular array of squares or rectangles of equal size. The weed pressure may be evaluated for each grid for generating a weed pressure map for the plantation field.

The term "primary weed control technique" as used herein may denote a weed control technique that is applied to manage weeds at a field scale. For example, the primary weed control technique may be a weed control technique with lower weed-control costs. As a further example, the primary weed control technique may be a non-selective weed control technique, such as a single herbicide used to control most weeds—grasses, sedges and broadleaves.

The term "secondary weed control technique" as used herein may denote a weed control technique that is applied to manage weeds at a local scale in the field. The secondary weed control technique may be a weed control technique with higher weed-control costs. The secondary weed control technique may be a selective weed control technique for specific weed types.

The term "weed control technique" as used herein may be grouped broadly into mechanical, chemical, and biological methods. Weed control techniques vary depending of several factors related to geographic location, cropping system followed, current crop species, weed species traced and their intensity, and economic consideration. Chemical control may use selective or non-selective herbicides based on weed flora. Mechanical weed control is any physical activity that inhibits unwanted plant growth.

The term "weed treatment device" as used herein may denote a chemical weed treatment device. For example, ground robots with variable-rate applicators, aerial sprayers, or other variable-rate herbicide applicators. The weed treatment device may denote physical/mechanical weed treatment device, e.g. ground robots using physical methods to remove, injure, kill, or make the growing conditions unfavorable for the weeds. The weed treatment device may be regulated by the configuration information. As will be explained in detail hereafter, the configuration may be generated by a decision-support system, e.g. a remote server of a service provider. The generated configuration information may be loaded onto the weed treatment device to enable the weed treatment device to perform weed treatment.

The term "decision-support system" as used herein may denote a computing device or a computing system, regardless of the platform, being suitable for executing program code related to the proposed method. For example, the decision-support system may be a smartphone or other mobile devices with a processor suitable for implementation of the proposed method and/or related decision-support system. As a further example, the decision-support system may also be a computer system. The decision-support system may also be a remote server that provides a web service to facilitate weed management of a plantation field e.g. by a farmer of the plantation field. The remote server may have a more powerful computing power to provide the service to multiple users to manage many different plantation fields. The remote server may include an interface through which a user can authenticate (e.g. by providing a username and password); and an interface for creating, modifying, and deleting configuration information of the weed treatment devices of the user. The configuration information may be generated by the decision-system by analyzing the image data. For example, the configuration information may comprise geographical information of the target area, start time for applying the weed control, active ingredient to be applied, etc. The configuration information may be loaded onto the weed treatment devices to enable the weed treatment devices to perform weed treatment. It is also noted that the image recognition unit, the weed pressure mapping unit, the determination unit, and the controlling unit of the decision-support system may be separate devices. For example, the controlling unit may be a smartphone with a display for controlling the weed treatment devices, whereas the image recognition unit, the weed pressure mapping unit, the determination unit are implemented with a computer.

Figure 1:
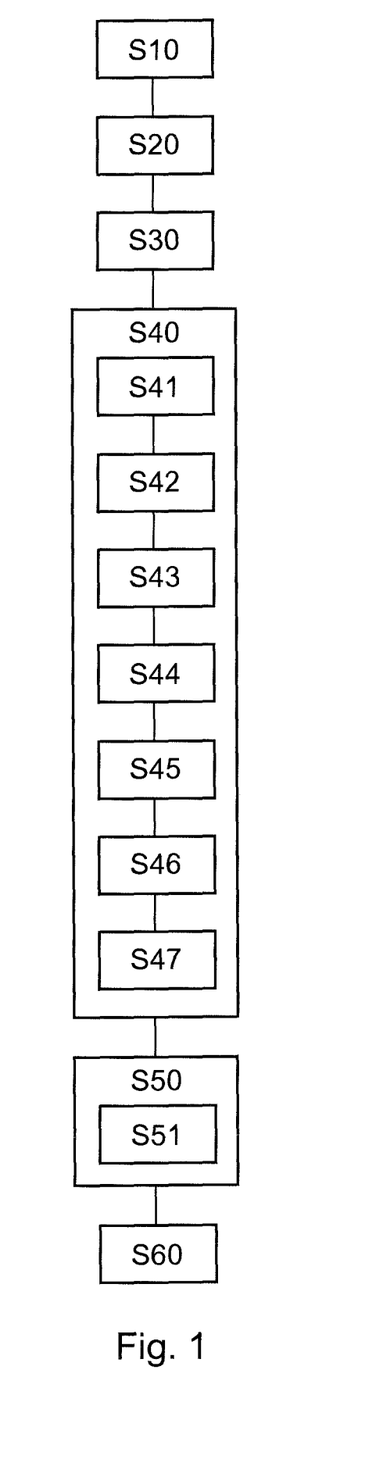
FIG. 1 shows a schematic drawing of a method according to an exemplary embodiment of the present disclosure.

FIG. 1 shows a block diagram of an embodiment of a method for weed management in a plantation field. In step S10, image data of the plantation field may be collected after being applied with a primary weed control technique. The primary weed control technique may be e.g. a weed control technique with lower weed-control costs and/or a non-selective weed control technique. The image data may be collected using ground, satellite or drone platforms. To collect the image data, ground robots, satellite or drones may be fitted with visual, IR, NIR, and/or thermal sensors. These sensors may provide spectral data and/or thermal data of the plantation field. The image data may be transmitted to a decision-support system automatically e.g. via a network, for further analysis. The image data may also be uploaded by a user, e.g. via a network, to a decision-support system for further analysis.

In step S20, items indicative an occurrence of a weed may be recognized in the collected image data. For example, spectral imagery may provide distinction among soil surface, weeds in the inter-row and crop in the rows, as weeds and crops have different spectral responses.

In step S30, a weed pressure map indicative of a weed pressure in the plantation field is prepared based on the recognized items. For example, the plantation field may be divided into a plurality of grids in form of a rectangular array of squares or rectangles of equal size. The weed pressure may be evaluated for each grid for generating a weed pressure map for the plantation field.

In step S40, one or a plurality of target areas for weed management is determined in the generated weed pressure map, if the weed pressure of the one or the plurality of target areas extends a predetermined threshold. A treatment control signal is outputted indicative of the one or the plurality of determined target areas, which when transmitted causes an activation of at least one weed treatment device to apply at least one secondary weed control technique to the one or the plurality of determined target areas, wherein the at least one secondary weed control technique is different from the primary weed control technique. For example, weed pressure values may be ranged between 0 in case of total absence of weeds, and 100 in case of total absence of crops. For identification of the target areas, four categories for the weed pressure may be formulated. The interval bounds for the weed pressure may be as follows: WP1 (0-10), WP2 (11-20), WP3 (21-35), and WP4 (greater than 35). Areas with a weed pressure value falling into WP4 may, for example, be determined as target areas.

In optional step S50, at least one secondary weed control technique is applied with the at least one weed treatment device to the one or the plurality of target areas based on the treatment control signal. The at least one secondary weed control technique is different from the primary weed control technique. The secondary weed control technique may comprise a chemical control technique using e.g. expensive or selective herbicides based on weed flora. The secondary weed control technique may comprise, alternatively or additionally, a mechanical weed control technique. In other words, the secondary weed control technique may adopt integrated procedures that may involve a few different methods, such as a combination of mechanical and chemical procedures to eradicate weeds at a local scale.

In other words, the weed management at a field scale with the primary weed control technique is combined with the weed management at a local scale with at least one secondary weed control technique, for example, targeting at weeds that are resistant to the primary weed control technique but susceptible to the secondary weed control technique. As the primary weed control technique may be less expensive than the secondary weed control technique, this may be helpful in reducing costs on weed control. Additionally, the secondary weed control technique may be selected to be more effective for weeds that are resistant to the primary weed control technique, it is devoid of ineffective problem of the primary weed control technique.

The primary and secondary weed control techniques may be selected based on several factors, such as geographic location, cropping system followed, current crop species, weed species and their intensity, and economic consideration. The weed may be identified using their spectral signatures. Often, the spectral signatures of weeds common to an area or cropping system are available. This may allow the discrimination between weed and crop using spectral signatures and further the judgment of the percentage of weeds that contribute to the total cover of both crops and weeds in a given area, i.e. weed pressure.

For example, the primary weed control technique is a chemical weed control technique with a first active ingredient. The at least one secondary weed control technique may comprise a chemical weed control technique with a second active ingredient and/or a mechanical weed control technique. The first active ingredient may be less expensive than the secondary active ingredient. Alternatively or additionally, the first active ingredient may be non-selective, whereas the second active ingredient may be selective for weeds that are resistant to the first active ingredient.

Optionally, the determination of one or a plurality of target areas for weed management may further comprise the step of determining S41 a geographical information of the one or the plurality of target areas. The geographical information may use Global Position System (GPS) for precision guidance of treatment devices, e.g. ground robots with e.g. variable-rate applicator, aerial sprayer, and/or other variable rate herbicide applicators or mechanical methods.

Optionally, the determination of one or a plurality of target areas for weed management may further comprise the step of identifying S42 a single or a plurality of weeds in the one or the plurality of identified target areas for weed management, and determining S43 a weed type and/or an intensity of the single or the plurality of recognized weeds. Target weed species with specific spectral reflectance pattern may be picked up by the multispectral imagery. Weeds may be identified and mapped using object-based image analysis (OBIA) using segmentation. Weed traits such as location, proximity and hierarchical relationships with the spectra of the object (weed/crop) may be used. A library or data bank of spectral signatures of various weed species may be used to discriminating different types of weeds. This may be done by using a machine learning technique. Machine learning algorithms build a mathematical model of sample data of a plurality of weeds (e.g. spectral data, or image data) known as "training data", in order to make predictions or decisions without being explicitly programmed to perform the task. This may advantageously allow the site-specific weed management and the selection of appropriate secondary weed control technique for target areas with different types of weeds.

Optionally, the determination of one or a plurality of target areas for weed management may further comprise the step of determining S44 rows and/or a density of a single or a plurality of crops in the plantation field based on the collected image data. Crops may be identified based on specific spectral reflectance pattern Similar to weed identification, crop traits such as location, proximity and hierarchical relationships with the spectra of the object (weed/crop) may be used. Machine learning algorithm may also be used. This may advantageously allow a better identification of locations infested with resistant weeds.

Optionally, the determination of one or a plurality of target areas for weed management may further comprise identifying S45 a single or a plurality of target areas with at least one resistant weed based on historical information of the plantation field. For example, farmers may practice precision techniques by utilizing weed infestation maps of previous seasons. Weed stresses that impact the crop are persistent. In general, if there was a weed present in the last cultivation, there probably be a weed in the next cultivation. The location of this weed stress is known and can be geo-located within e.g. inches. These stresses, including resistant weeds, may be identified and monitored for when and where to look to detect the next emergence. Historical data may include a weed map generated in the last cultivation, pre and during Harvest Burndown, or application sequences in autumn and spring. This may advantageously allow the application of secondary weed control technique only at locations prone to weed infestation. For example, herbicides may be applied to the plantation field either as pre-emergent spray to soil or incorporated at a depth, i.e. soil-injection.

Optionally, the determination of one or a plurality of target areas for weed management may further comprise identifying S46 a single or a plurality of target areas, where the use of crop protection products is not recommended, based on historical information of the plantation field. An application of a mechanical weed control technique is recommended in the single or the plurality of the identified target areas Historical data may include a weed map generated in the last cultivation, pre and during Harvest Burndown, or application sequences in autumn and spring. Farmers may also utilize weed infestation maps of previous seasons with areas indicating that the use of chemical control is not or less effective. Thus, in the present season, the farmers can use a mechanical control technique for a better weed management of these areas.

Optionally, the determination of one or a plurality of target areas for weed management may further comprise determining S47, for each determined target area, a respective secondary weed control technique. The treatment control signal is indicative of the respective determined secondary weed control technique for each target area, which when transmitted causes an activation of at least one weed treatment device to apply, for each determined target area, the respective determined secondary weed control technique. The application of at least one secondary weed control technique comprises applying S51, for each determined target area, the respective determined secondary weed control technique. The secondary weed control technique may be determined based on historical information of the plantation field, e.g. areas where a mechanical control technique is recommended based on the weed map of previous seasons. For example, the secondary weed control technique may be determined based on the determined weed type and/or intensity. This may advantageously allow determining, for each target area, which weed control technique, e.g. chemical or mechanical, to be applied to. This may also allow determining what kind of herbicide to be used. This may advantageously offer an improved weed control at a local scale.

Optionally, the method may further comprise the step of generating S60 a field record comprising at least one of the following: i) the generated weed pressure map, ii) the determined geographical information of the single or the plurality of target areas with a weed pressure above a predefined threshold, iii) the determined weed type and/or the determined weed density of the single or the plurality of target areas, iv) the identified rows and/or the identified density of the single or the plurality of crops in the plantation field, v) the identified single or the identified plurality of target areas with at least one resistant weed, and vi) the identified one or plurality of target areas to be applied with a mechanical weed control technique. The field report may be used for online or offline precision farming.

Figure 2:
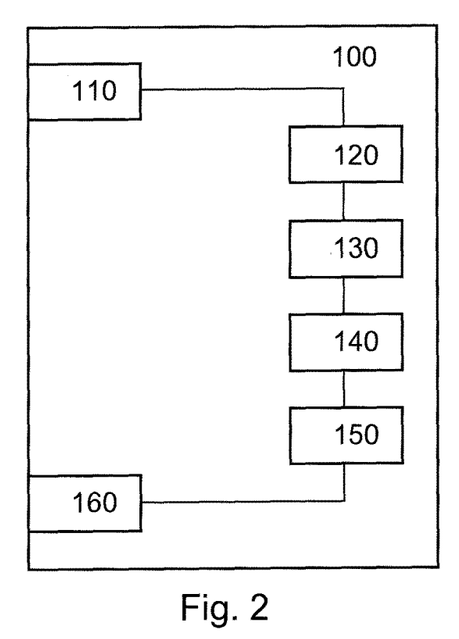
FIG. 2 shows a schematic drawing of a decision-support system according to an exemplary embodiment of the present disclosure.

FIG. 2 schematically shows an embodiment of a decision-support system 100 for weed treatment. The decision-support system 100 may be a server that provides a remote service e.g. via internet, to facilitate management of image data from many different plantation fields. The server may include an interface through which a user (e.g. a farmer) can manage the image data and related information. For example, the decision-support system 100 may interface with users with webpages served by the decision-support system to facilitate the management of the image data and related information. The related information may include e.g. one or more target areas to be treated, secondary weed control technique to be applied for these target areas, configuration information of one or more weed treatment devices. The configuration information of the one or more weed treatment devices may include, but not limited to, the start time of the treatment, the geographical information of the target areas, and the type of ingredient to be used. These information may be loaded onto the one or more weed treatment devices e.g. via a network, to enable the one or more weed treatment devices to perform a secondary weed control on the target areas. Alternatively, the decision-support system 100 may be a local computing device, such as a personal computer (PC).

Figure 4:
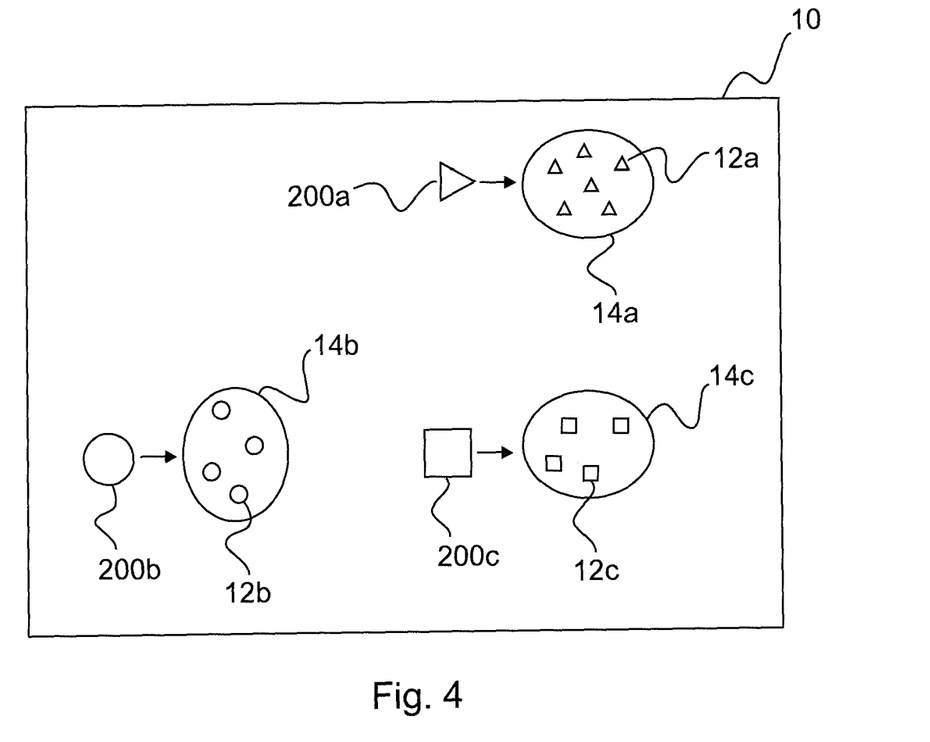
FIG. 4 shows a schematic drawing of a plantation field according to an exemplary embodiment of the present disclosure.

In the following, the decision-support system 100 is discussed together with FIG. 4, which schematically shows a general set up of a plantation field 10.

The decision-support system 100 comprises a data interface 110, an image recognition unit 120, a weed pressure mapping unit 130, a determination unit 140, a controlling unit 150, and a treatment control interface 160.

The data interface 110 may be a secure digital (SD) memory card interface, a universal serial bus (USB) interface, a Bluetooth interface, a wireless network interface, etc. suitable to receive the image data collected using ground, satellite or drone platforms. The image data may comprise spectral data or thermal data that can be used to discriminate weeds and crops and preferably to discriminate different types of weeds. The image data may also comprise GPS data adapted for providing guidance of the weed treatment devices to the target areas.

The image recognition unit 120 is configured to recognize items 12a, 12b, 12c indicative of an occurrence of a weed in image data of the plantation field 10 received from the data interface 110. For example, FIG. 4 illustrates a plurality of items 12a, 12b, and 12c indicative of an occurrence of a weed. The items 12a, 12b, and 12c are illustrated in different shapes for indicating that they have different spectral or thermal responses in the image data and therefore may represent different types of weeds that require different treatment.

The weed pressure mapping unit 130 is configured to generate a weed pressure map indicative of a weed pressure in the plantation field based on the recognized items. For example, the plantation field may be divided into a plurality of grids in form of a rectangular array of squares or rectangles of equal size. The weed pressure may be evaluated for each grid for generating a weed pressure map for the plantation field.

The determination unit 140 is configured to determine one or a plurality of target areas 14a, 14b, 14c for weed management in the generated weed pressure map, if the weed pressure of the one or the plurality of target areas extends a predetermined threshold. The determination unit 140 may determine the target area or areas if the weed pressure value, e.g. in a grid, is above a predefined threshold, which may indicate the existence of weeds.

The controlling unit 150 is configured to generate a treatment control signal indicative of the one or the plurality of determined target areas and to output the treatment control signal to the treatment control interface, which when transmitted causes an activation of at least one weed treatment device to apply at least one secondary weed control technique to the one or the plurality of determined target areas. The controlling unit 150 may be a smartphone or a mobile device to be used by a farmer in the plantation field for regulating the activity of weed treatment devices. The controlling unit 150 may also be an integrated part of a computer decision-support system for regulating the activity of weed treatment devices.

Optionally, the determination unit 140 may be configured to determine, for each determined target area, a respective secondary weed control technique. The treatment control signal is indicative of the respective determined secondary weed control technique for each target area, which when transmitted causes an activation of at least one weed treatment device to apply, for each determined target area, the respective determined secondary weed control technique. In an example, the secondary weed control technique may be determined based on historical information of the plantation field, e.g. areas where a mechanical control technique is recommended based on the weed map of previous seasons. In a further example, the secondary weed control technique may be determined based on the actual information based on the collected image data, such as weed types and/or intensity.

Thus, the decision-support system may allow image processing, locating weeds, noting the intensity of infestation and mapping them as well as regulating the activity of weed treatment devices.

Figure 3:
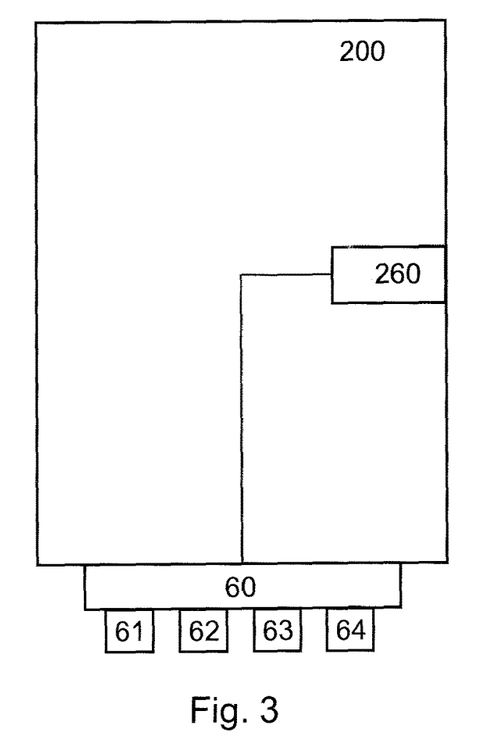
FIG. 3 shows a schematic drawing of a weed treatment device according to an exemplary embodiment of the present disclosure.

FIG. 3 schematically shows an embodiment of a weed treatment device 200 for weed treatment in the plantation field. In the following, the weed treatment device is discussed together with FIG. 4.

The weed treatment device 200 comprises a treatment control interface 260 and a treatment arrangement 60 with one or a plurality of treatment units 61, 62, 63, 64. The weed treatment device 200 may be at least one selected from a mechanical weed treatment device configured to be steered by the controlling unit to apply a mechanical weed control technique to the one or the plurality of target areas, and a chemical weed treatment device configured to apply a second crop protection product to the one or the plurality of target areas. For example, the weed treatment device 200 may be e.g. ground robots with variable-rate applicators, aerial sprayers, or other variable-rate herbicide applicators. The treatment arrangement may be a nozzle arrangement comprising a plurality of nozzles as treatment unit. As a further example, the weed treatment device 200 may be a physical/mechanical treatment device with an arrangement of mechanical means as treatment units.

The treatment control interface 260 of the weed treatment device is connectable to the treatment control interface 160 of the decision-support system 100 as discussed in FIG. 2. This may be done wirelessly, thus allowing a remote control of the weed treatment device 200 via the decision-support system 100. The treatment control interface 260 is configured to receive a treatment control signal indicative of one or a plurality of target areas 14a, 14b, 14c for weed treatment as shown in FIG. 4.

The weed treatment device 200 is configured to activate respective ones of treatment units 61, 62, 63, 64 of the treatment arrangement 60 to apply a secondary weed control technique to the one or the plurality of target areas 14a, 14b, 14c based on the received treatment control signal.

Optionally, the treatment control signal is indicative of a respective secondary weed control technique for each target area 14a, 14b, 14c. The weed treatment device 200 is configured to apply the secondary weed control technique to a target area 14a, 14b, 14c where the indicated secondary weed control technique matches that of the weed treatment device. For example, in FIG. 4, multiple weed treatment devices 200a, 200b, 200c are deployed in the plantation field 10 for weed treatment in the target areas 14a, 14b, 14c, each having a weed control technique that matches the identified secondary weed control technique of the respect target areas to be treated. For example, the weed treatment device 200a may be a mechanical weed treatment device for applying mechanical weed control to the target area 14a. The weed treatment devices 200b, 200c may be chemical weed treatment devices, which apply different herbicides to the target areas 14b,14c. Thus, the weeds in each target area may be treated differently with an appropriate weed control technique.

Thus, the weed treatment device, which is regulated by the decision-support system, may allow precision weed control techniques based on the weed infestation map.

Figure 5:
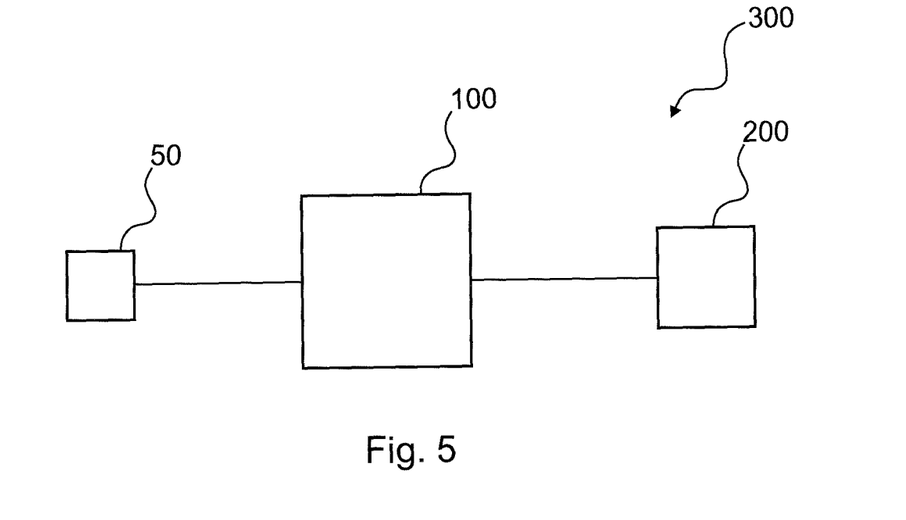
FIG. 5 shows a schematic drawing of a system for weed treatment according to an exemplary embodiment of the present disclosure.

FIG. 5 schematically shows an embodiment of a system 300 for weed treatment in the plantation field. The system comprises a sensor carrier 50, a decision-support system 100 as described above and at least one weed treatment device as described above. The sensor carrier 50, the decision-support system 100 and the at least one weed treatment device 200 may be associated with a network. For example, the network may be the internet. The network may alternatively be any other type and number of networks. For example, the network may be implemented by several local area networks connected to a wide area network. The network may comprise any combination of wired networks, wireless networks, wide area networks, local area networks, etc. In some implementations, the decision-support system 100 may be a server to provide a web service to facilitate weed management of a plantation field. The user (e.g. a farmer) may collect image data with a drone in his plantation field. He may upload the image data e.g. via the network, to the decision-support system 100 for analysis. The decision-support system 100 may output a treatment control signal comprising the configuration information of the weed treatment devices for activating these weed treatment device to perform weed management.

The sensor carrier 50 is configured to collect image data of the plantation field after being applied with a primary weed control technique. The sensor carrier 50 may be e.g. ground robots, satellite or drones fitted with visual, IR, NIR, and/or thermal sensors for collecting the image data.

The decision-support system 100 is configured to determine one or a plurality areas for weed control and preferably, for each determined target area, a respective secondary weed control technique based on the collected image data and to control the at least one weed treatment device 200 to apply at least one secondary weed control technique to the one or the plurality of target areas.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method for weed management in a plantation field, the method comprising:
   collecting (S10) image data of the plantation field (10) after being applied with a primary weed control technique;

recognizing (S20) items (12a, 12b, 12c) indicative of an occurrence of a weed in the collected image data;

generating (S30) a weed pressure map indicative of a weed pressure in the plantation field based on the recognized items; and determining (S40) one or a plurality of target areas (14a, 14b, 14c) for the weed management in the generated weed pressure map, responsive to the weed pressure of each of the one or the plurality of target areas extending a predetermined threshold, and outputting a treatment control signal indicative of the one or the plurality of determined target areas, which, when transmitted, causes an activation of at least one weed treatment device to apply at least one secondary weed control technique to the one or the plurality of determined target areas, wherein the at least one secondary weed control technique is different from the primary weed control technique.

2. The method according to claim 1, further comprising:
applying (S50), with the at least one weed treatment device, the at least one secondary weed control technique to the one or the plurality of determined target areas based on the treatment control signal.

3. The method according to claim 1,
wherein the primary weed control technique is a chemical weed control technique with a first active ingredient; and
wherein the at least one secondary weed control technique comprises the chemical weed control technique with a second active ingredient and/or a mechanical weed control technique.

4. The method according to claim 1,
wherein the determination of the one or the plurality of target areas comprises:
determining (S41) a geographical information of the one or the plurality of target areas.

5. The method according to claim 1,
wherein the determination of the one or the plurality of target areas comprises:
recognizing (S42) a single or a plurality of weeds in the one or the plurality of identified target areas for the weed management; and
determining (S43) a weed type and/or a weed density of the single or the plurality of recognized weeds.

6. The method according to claim 1,
wherein the determination of the one or the plurality of target areas comprises:
identifying (S44) rows and/or a density of a single or a plurality of crops in the plantation field based on the collected image data;
identifying (S45) a single or a plurality of target areas with at least one resistant weed based on historical information of the plantation field; and/or
identifying (S46) a single or a plurality of target areas, where the use of crop protection products is not recommended, based on the historical information of the plantation field and recommending an application of a mechanical weed control technique in the single or the plurality of the identified target areas.

7. The method according to claim 1,
wherein the determination of one or a plurality of target areas for weed control further comprises determining (S47), for each determined target area, a respective secondary weed control technique; and
wherein the treatment control signal is indicative of the respective determined secondary weed control technique for each target area, which, when transmitted, causes an activation of the at least one weed treatment device to apply, for each determined target area, the respective determined secondary weed control technique.

8. The method according to claim 1,
wherein the application of the at least one secondary weed control technique comprises applying (S51), for each determined target area, a respective determined secondary weed control technique based on the treatment control signal.

9. The method according to claim 1, further comprising:
generating (S60) a field record comprising at least one of the following:
i) the generated weed pressure map;
ii) the determined geographical information of the one or the plurality of target areas with a weed pressure above the predetermined threshold;
iii) the determined weed type and/or the determined weed density of the one or the plurality of target areas;
iv) the identified rows and/or the identified density of the one or the plurality of crops in the plantation field;
v) the identified one or the identified plurality of target areas with at least one resistant weed; or
vi) the identified one or plurality of target areas to be applied with a mechanical weed control technique.

10. A decision-support system (100) for weed management in a plantation field, the decision-support system comprising:
a data interface (110);
an image recognition unit (120);
a weed pressure mapping unit (130);
a determination unit (140);
a controlling unit (150); and
a treatment control interface (160);
wherein the image recognition unit is configured to recognize items indicative of an occurrence of a weed in image data of the plantation field received from the data interface, wherein the image data of the plantation field is received after the plantation field is applied with a primary weed control technique;
wherein the weed pressure mapping unit is configured to generate a weed pressure map indicative of a weed pressure in the plantation field based on the recognized items;
wherein the determination unit is configured to determine one or a plurality of target areas for the weed management in the generated weed pressure map, responsive to the weed pressure of each of the one or the plurality of target areas extending a predetermined threshold; and
wherein the controlling unit is configured to generate a treatment control signal indicative of the one or the plurality of determined target areas and to output the treatment control signal to the treatment control interface, which, when transmitted, causes an activation of at least one weed treatment device to apply at least one secondary weed control technique to the one or the plurality of determined target areas, wherein the at least one secondary weed control technique is different from the primary weed control technique.

11. The decision-support system according to claim 10,
wherein the determination unit is configured to determine, for each determined target area, a respective secondary weed control technique; and
wherein the treatment control signal is indicative of the respective determined secondary weed control technique for each target area, which, when transmitted, causes an activation of at least one weed treatment device to apply, for each determined target area, the respective determined secondary weed control technique.

12. A weed treatment device (200, 200a, 200b, 200c) for weed treatment in a plantation field, the weed treatment device (200, 200a, 200b, 200c) comprising:
a treatment control interface (260);
a treatment arrangement (60) with one or a plurality of treatment units (61, 62, 63, 64);
wherein the treatment control interface of the weed treatment device is connectable to a treatment control interface of a decision-support system and configured to receive a treatment control signal indicative of one or a plurality of target areas for weed treatment; and
wherein the weed treatment device is configured to activate respective ones of treatment units of the treatment arrangement to apply a secondary weed control technique to the one or the plurality of target areas based on the received treatment control signal, wherein the secondary weed control technique is different from a primary weed control technique previously applied to the one or the plurality of target areas.

13. The weed treatment device according to claim 12,
wherein the treatment control signal is indicative of a respective secondary weed control technique for each target area; and
wherein the weed treatment device is configured to apply the secondary weed control technique to a target area where the respective secondary weed control technique matches that of the weed treatment device.

14. The weed treatment device according to claim 12,
wherein the weed treatment device is at least one selected from:
a mechanical weed treatment device configured to be steered by a controlling unit to apply a mechanical weed control technique to the one or the plurality of target areas (20); or
a chemical weed treatment device configured to apply a second crop protection product to the one or the plurality of target areas.

15. A system (300) for weed management in a plantation field,
the system (300) comprising:
a sensor carrier (50);
the decision-support system according to claim 10; and
the at least one weed treatment device;
wherein the sensor carrier is configured to collect the image data of the plantation field after being applied with a primary weed control technique; and
wherein the decision-support system is configured to determine the one or a plurality areas for weed control and preferably, for each of the determined target areas, a respective secondary weed control technique based on the collected image data and to control the at least one weed treatment device to apply the at least one secondary weed control technique to the one or the plurality of target areas, wherein the at least one secondary weed control technique is different from the primary weed control technique.

* * * * *